(12) United States Patent
Maldonado

(10) Patent No.: US 6,380,312 B1
(45) Date of Patent: Apr. 30, 2002

(54) THERMOPLASTIC ELASTOMER BLENDS

(75) Inventor: Arturo J. Maldonado, Charlotte, NC (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/527,838

(22) Filed: Mar. 17, 2000

(51) Int. Cl.$^7$ .................................................. C08F 8/00
(52) U.S. Cl. ........................ 525/191; 525/192; 525/232; 525/240
(58) Field of Search ................................. 525/191, 192, 525/232, 240

(56) References Cited

U.S. PATENT DOCUMENTS 4,311,628 A  1/1982  Abdou-Sabet et al. ..... 260/33.6
RE35,398 E  * 12/1996  Hazelton et al. ............ 524/425

* cited by examiner

Primary Examiner—Edward J. Cain
(74) Attorney, Agent, or Firm—Daniel Reitenbach

(57) ABSTRACT

Disclosed are elastomer blends with improved oil-resistance, which blends comprises:
  a) 100 parts by weight of a monoolefin copolymer or terpolymer;
  b) from about 5 to about 150 parts by weight of a polyolefin resin;
  c) from about 10 to about 80 parts by weight of one of the following:
    i) a copolymer of an olefin with a carboxylic acid and/or an ester of a carboxylic acid; or
    ii) a silicon modified olefinic rubber; and
  d) from about 1 to about 10 parts by weight of a phenolic curative.

19 Claims, No Drawings

THERMOPLASTIC ELASTOMER BLENDS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention is directed to thermoplastic elastomer blends with certain improved properties. More specifically, it relates to partially resin-cured thermoplastic elastomer blends with improved oil resistance when blended with, for example, an ethylene vinyl acetate resin or a silicone-modified olefinic rubber. The resulting compounds have improved oil resistance over similar peroxide-cured compositions.

2. Description of the Related Art

Oil resistance is important to the wire and cable industry and end users of their products. Oil resistance may be defined as the percent retention of the original unaged tensile strength and elongation at break. It therefore follows that a higher percent retention of the original unaged tensile strength and elongation at break is desirable, as this is indicative of the material having better oil resistance.

U.S. Pat. No. 4,311,628 is directed to a blend of an olefin rubber and a polyolefin resin in which the rubber is fully cured with a phenolic resin. However, there is no mention of using an olefin vinyl acetate copolymer or a silicon modified copolymer as an additional component.

BRIEF SUMMARY OF THE INVENTION

In one aspect, the present invention relates to a composition which comprises:
a) 100 parts by weight of a monoolefin copolymer or terpolymer;
b) from about 5 to about 150 parts by weight of a polyolefin resin;
c) from about 10 to about 80 parts by weight of one of the following:
  i) a copolymer of an olefin with a carboxylic acid and/or an ester of a carboxylic acid; or
  ii) a silicon modified olefinic rubber; and
d) from about 1 to about 10 parts by weight of a phenolic curative.

In another aspect, the present invention relates to a method which comprises curing the following composition:
a) 100 parts by weight of a monoolefin copolymer or terpolymer;
b) from about 5 to about 150 parts by weight of a polyolefin resin;
c) from about 10 to about 80 parts by weight of one of the following:
  i) an olefin vinyl acetate copolymer with a vinyl acetate content of from about 15% to about 60%; or
  ii) a silicon modified copolymer;
wherein the curing is performed with a phenolic curative.

DETAILED DESCRIPTION OF THE INVENTION

The monoolefin copolymer or terpolymer component of the compositions of the present invention includes monoolefin copolymer rubbers and terpolymer rubbers. Suitable monoolefin copolymer rubbers include essentially non-crystalline, rubbery copolymers of two or more alpha-monoolefins, optionally copolymerized with at least one polyene, usually a diene. However, saturated monoolefin copolymer rubber, commonly called "EPM" rubber, can be used, for example copolymers of ethylene and propylene. Examples of unsaturated monoolefin copolymer rubber, commonly called "EPDM" rubber, which are satisfactory comprise the products from the polymerization of monomers comprising two monoolefins, generally ethylene and propylene, and a lesser quantity of non-conjugated diene. Suitable alpha monoolefins are illustrated by the formula $CH_2=CHR$ in which R is hydrogen or alkyl of 1–12 carbon atoms, examples of which include ethylene, propylene, 1-butene, 1-pentene, 1-hexene, 2-methyl-1-propene, 3-methyl-1-pentene, 4-methyl-1-pentene, 3,3-dimethyl-1-butene, 2,4,4-trimethyl-1-pentene, 5-methyl-1-hexene, 1,4-ethyl-1-hexene and others. Satisfactory non-conjugated dienes include straight chain dienes such as 1,4-hexadiene, cyclic dienes such as cyclooctadiene and bridged cyclic dienes such as ethylidenenorborene. Grades of EPM and EPDM rubbers suitable for the practice of the invention are commercially available.

The polyolefin resin component of the compositions of the present invention include crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resins, and preferably polyethylene or polypropylene, may be advantageously used in the practice of the invention, with polypropylene being preferred.

The olefin-acid/ester copolymer component of the compositions of the present invention includes copolymers of olefins with a carboxylic acid and/or unsaturated esters of carboxylic acids. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Suitable ester monomers include vinyl acetate, methyl acrylate, ethyl acrylate, propyl acrylate, butyl acrylate, hexyl acrylate, octyl acrylate, lauryl acrylate, benzyl acrylate, N,N-dimethylaminoethyl acrylate, methyl methacrylate, ethyl methacrylate, propyl methacrylate, butyl methacrylate, hexyl methacrylate, octyl methacrylate, methyl fumarate, ethyl fumarate, propyl fumarate, butyl fumarate, dimethyl fumarate, methyl maleate, ethyl maleate, propyl maleate, butyl maleate, dimethyl maleate, diethyl maleate, dipropyl maleate, dibutyl maleate, and mixtures thereof. Suitable carboxylic acid monomers include the acids corresponding to the ester monomers set forth above, and mixtures thereof. Particularly preferred are copolymers of ethylene with at least about 40 weight percent vinyl acetate, preferably at least about 50 weight percent vinyl acetate.

The silicon modified olefinic rubber component of the composition of the present invention includes olefinic rubbers which have been modified with a silicon-containing polymer. Suitable olefinic rubbers include EPM and EPDM rubbers described above, as well as others including ethylene-vinyl acetate copolymer rubbers. The silicon-containing polymer component includes various organopolysiloxanes, methoxy-stopped silicones, silanol stopped silicones, etc. Each of the foregoing components may be manufactured by conventional techniques, and many are commercially available.

Particularly preferred silicon modified olefinic rubbers include silicone-modified EPDM with polydimethylsiloxane polymers with either vinyl or methyl-terminated polymer chains, preferably methyl-terminated polymer chains. The vinyl content of the polydimethylsiloxane polymer can range between 0 to 4 percent, preferably between 0.1 to 1 weight percent vinyl. The EPDM component of the silicone-modified EPDM can be 10 to 50 weight percent, preferably between 20 to 30 weight percent. Especially preferred modified rubbers are sold under the ROYALTHERM mark by Uniroyal Chemical Company. The modified rubbers may also contain additives such as fillers, etc.

The phenolic curative component of the compositions of the present invention includes any phenolic curative system which is capable of curing the monoolefin copolymer or terpolymer. A basic ingredient of such system is a phenolic curing resin made by condensation of halogen substituted phenol, $C_1$–$C_{10}$ alkyl substituted phenol or unsubstituted phenol with an aldehyde, preferably, formaldehyde, in an alkaline medium or by condensation of bifunctional phenoldialcohols. Additional information concerning phenolic curatives may be found in U.S. Pat. No. 4,311,628, the content of which is incorporated herein by reference.

It has been observed that the compositions of the present invention display improved oil resistance without the need to fully crosslink the rubber component. Thus, in a preferred embodiment of the present invention, the compositions are cured to a gel content of less than about 97%, more preferably in the range of about 85–95%, and most preferably about 90%. It will be understood that gel content refers to the weight % of curable rubber extractable in cyclohexane at 23° C.

The compositions of the present invention may be made by conventional blending techniques which would be readily apparent to those skilled in the art. A suitable blending technique includes the use of an internal mixer, such as a Banbury. As one example, the monoolefin copolymer or terpolymer and polyolefin resin may be mixed at a temperature where the mixture starts to melt, then the other components may be added. It may be necessary to then raise the temperature in order to promote the vulcanization reaction. The mixed composition may then be discharged from the internal mixer, and further refined and cooled.

In addition to containing the components described above, the compositions of the present invention may include components conventionally used in thermoplastics, such as thermoplastic polyolefins, thermoplastic vulcanizates or conventional crosslinkable thermoset elastomers.

The compositions of the present invention are thermoplastic and may be fabricated into useful articles which would be well known to those in art, by conventional plastics processing methods, including injection molding or extrusion. Suitable products include cable insulation and jackets, electrical molded goods, weatherstripping etc.

The following non-limiting examples are illustrative of the processes and products of the present invention.

EXAMPLES 1–2 and

Comparative Examples A–B

In this group of examples, several polymer blends were made and tested. Examples 1 and 2 are blends according to the present invention, which comprise EPDM, polypropylene, a phenolic resin, and either a silicone-modified EPDM (example 1) or an ethylene vinyl acetate copolymer (example 2). Comparative Example A is a peroxide-cured blend of EPDM and polypropylene. Comparative Example B comprises SANTOPRENE 201-73 (thermoplastic vulcanizate made by Advanced Elastomer Systems; nominal Shore A hardness value of 70). The blends of Examples 1 and 2 and Comparative Example A were made in a Banbury mixer with a capacity of 1600 cubic centimeters. The polypropylene resin and EPDM were added and mixed to at least 160° C. so the mixture starts to melt before adding the other part A ingredients. After the other part A ingredients were added, the temperature was raised to 187° C. so that the vulcanization reaction could commence. The part B ingredients were then added, and mixing continued for an additional two minutes. The mixed composition was then discharged from the internal mixer, refined on a two roll mill, and cooled to ambient temperature. The composition of each example is set forth in Table 1.

TABLE 1

| EXAMPLE | A | 1 | 2 | B |
|---|---|---|---|---|
| Part A | | | | |
| ROYALENE X-3751[1] | 100.0 | 180.0 | 100.0 | |
| PRO-FAX 6723[2] (0.8 MFI) | 82.0 | 82.0 | 82.0 | |
| ROYALTHERM 363[3] | — | 25.0 | — | |
| LEVAPREN 500[4] | — | — | 25.0 | |
| POLYBOND 3200[5] | — | 7.5 | 7.5 | |
| Zinc Stearate | 1.6 | 1.6 | 1.6 | |
| VC-60[6] | 1.7 | — | — | |
| SP-1055[7] | — | 6.8 | 6.8 | |
| SUNPAR 150[8] | — | 127.0 | 127.0 | |
| MAGLITE D[9] | — | 0.3 | 0.3 | |
| Part B | | | | |
| NAUGARD XL-1[10] | 1.3 | 1.3 | 1.3 | |
| NAUGARD p[11] | 1.8 | 1.8 | 1.8 | |
| Total | 188.4 | 353.3 | 353.3 | |
| % GEL | 91.2 | 90.9 | 89.8 | 99.0 |

[1]EPDM with 5% ENB, 76/24 E/P, ML = 60 @ 125 C
[2]Polypropylene homopolymer
[3]Silicone-modified EPDM
[4]Ethylene vinyl acetate with 50% vinyl acetate content
[5]Polypropylene grafted with maleic anhydride
[6]bis (t-butylperoxy)diisopropylbenzene
[7]Phenolic resin
[8]Parafinic process oil
[9]Magnesium oxide
[10]2,2'-oxamidobis-[ethyl 3-(3,5-di-t-butyl-4-hydroxyphenyl)]propionate
[11]Tris (monononylphenyl)phosphite The compositions of Examples 1–2 and A–B were subjected to various standard stress/strain tests typically used in the elastomer industry (Tb=tensile strength at break; Eb=elongation at break). The unaged properties. were measured and compared to the properties after subjecting the test specimens to aging for 7 days at 136° C., after 7 days at 60° C. in IRM 902 oil, and after 18 hours at 121° C. in IRM 902 oil. The results are set forth in Table 2.

TABLE 2

| Example | A | 1 | 2 | B |
|---|---|---|---|---|
| Unaged | | | | |
| Hardness, ShoreA | 93 | 76 | 79 | 77 |
| 200% Modulus, psi | 1520 | 710 | 670 | 860 |
| Tb, psi | 2610 | 1460 | 1410 | 1320 |
| Eb, % | 330 | 500 | 500 | 480 |
| After 7 days @ 136° C. | | | | |
| Tb, psi | 2110 | 1710 | 1630 | 1355 |
| Eb, % | 380 | 480 | 500 | 480 |
| Tb retention, % | 81% | 117% | 116% | 103% |
| Eb retention, % | 115% | 96% | 100% | 100% |
| After 7 days @ 60° C. IRM902 Oil | | | | |
| Tb, psi | 750 | 1110 | 1150 | 1055 |
| Eb, % | 100 | 370 | 440 | 405 |
| Tb retention, % | 29% | 76% | 82% | 80% |
| Eb retention, % | 30% | 74% | 88% | 84% |
| After 18 hr @ 121° C. IRM902 Oil | | | | |
| Tb, psi | 840 | 1030 | 1010 | 1075 |
| Eb, % | 120 | 310 | 300 | 335 |
| Tb retention, % | 32% | 71% | 72% | 81% |
| Eb retention, % | 36% | 62% | 60% | 70% |

The data in Table 2 show that blends according to the present invention have improved oil resistance over similar compositions using a peroxide to vulcanize the polymers.

What is claimed is:

1. A composition which comprises:
   a) 100 parts by weight of a monoolefin copolymer or terpolymer;
   b) from about 5 to about 150 parts by weight of a polyolefin resin;
   c) from about 10 to about 80 parts by weight of a silicon modified olefinic rubber; and
   d) from about 1 to about 10 parts by weight of a phenolic curative.

2. The composition of claim 1, wherein component a) is an EPDM rubber.

3. The composition of claim 1, wherein the polyolefin resin is selected from the group consisting of polyethylene and polypropylene.

4. The composition of claim 1, wherein the silicone modified copolymer is a silicon-modified EPDM.

5. The composition of claim 1, wherein the curative is a phenolic resin.

6. The composition of claim 1, wherein the composition is cured to a gel content of less than about 97%.

7. The composition of claim 6, wherein the composition is cured to a gel content of about 90%.

8. An article manufactured from the composition of claim 1.

9. A method which comprises curing the following composition:
   a) 100 parts by weight of a monoolefin copolymer or terpolymer;
   b) from about 5 to about 150 parts by weight of a polyolefin resin;
   c) from about 10 to about 80 parts by weight of a silicon modified copolymer; wherein the curing is performed with a phenolic curative.

10. The method of claim 9, wherein component a) is an EPDM rubber.

11. The method of claim 9, wherein the polyolefin resin is selected from the group consisting of polyethylene and polypropylene.

12. The method of claim 9, wherein the silicone modified copolymer is a silicon-modified EPDM.

13. The method of claim 9, wherein the curative is a phenolic resin.

14. The method of claim 9, wherein the composition is cured to a gel content of less than about 97%.

15. The method of claim 9, wherein the composition is cured to a gel content of about 90%.

16. A molded or extruded product made from the composition of claim 1.

17. The product of claim 16, wherein the product comprises cable insulation.

18. A molded or extruded product made from the product of the method of claim 9.

19. The product of claim 18, wherein the product comprises cable insulation.

* * * * *